Jan. 21, 1964    V. B. KORIAGIN    3,118,411
AERO-GLIDE BOAT
Filed July 12, 1960    3 Sheets-Sheet 2
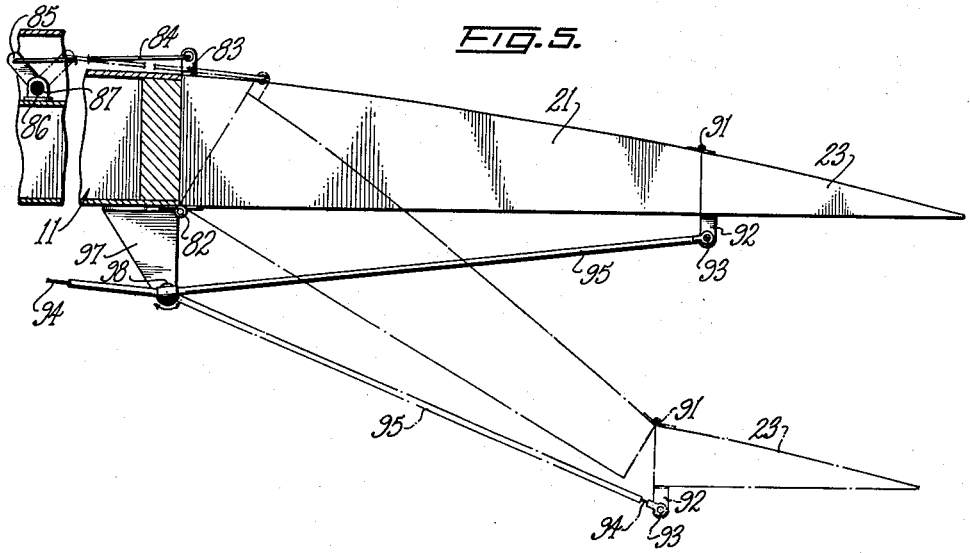
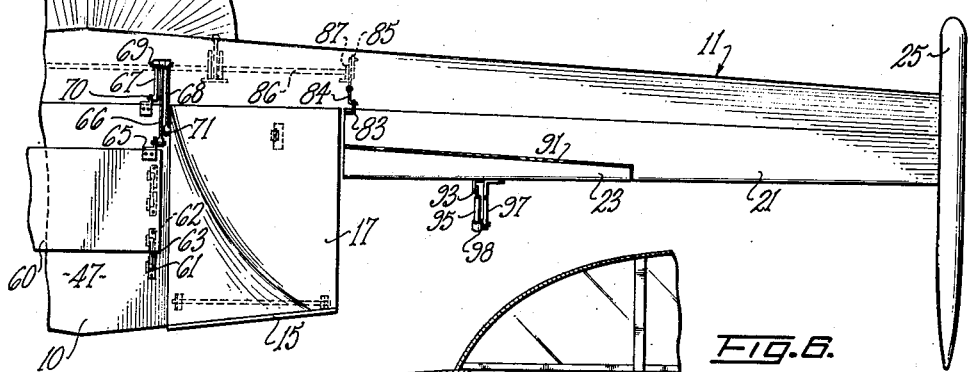
INVENTOR.
VSEVOLOD B. KORIAGIN
BY
ATTORNEYS

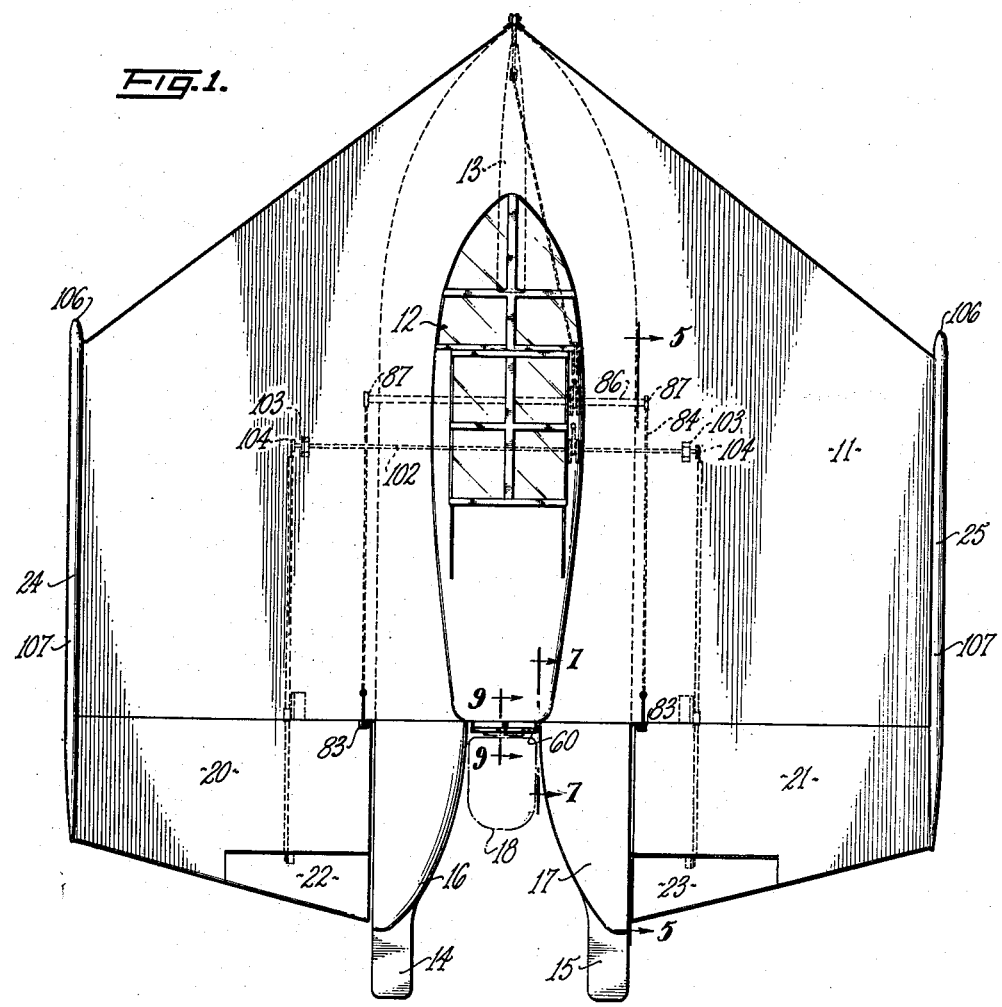

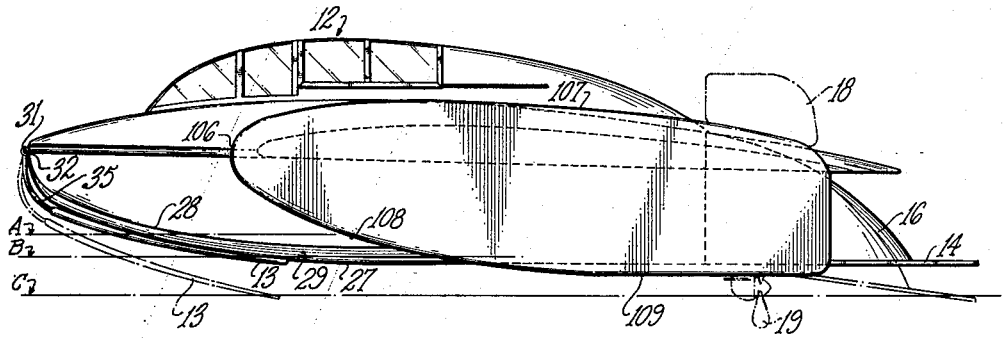

United States Patent Office 3,118,411
Patented Jan. 21, 1964

3,118,411
AERO-GLIDE BOAT
Vsevolod B. Koriagin, Glendale, Calif., assignor to Lockheed Aircraft Corporation, Burbank, Calif.
Filed July 12, 1960, Ser. No. 42,428
20 Claims. (Cl. 114—66.5)

The present invention relates generally to waterborne craft, more particularly an aquatic vehicle that is aerodynamically and hydrodynamically supported for high speed movement on the surface of rough or calm water.

The present invention is not to be confused with aquatic vehicles which are entirely buoyantly supported, or craft of the hydrofoil type. With respect to the former type, high speeds are attained, if at all, by achieving planing speeds, the craft thus becoming a hydroplane. On the other hand, hydrofoil craft are supported at cruising speeds by virtue of airfoil shaped members which ride submerged in the water to produce lift hydrodynamically, i.e. by a pressure differential between the lower and upper sides of the airfoil section. According to my invention, an aquatic vehicle is supported at cruising speed by a combination of aerodynamic lift and the dynamic reaction of the water on stabilizing, planing skis or on hydrofoils. However, it will be seen that this result is achieved without introducing any of the complexity of controlling a craft that is ordinarily associated with aircraft. For lack of a better or more descriptive name, I have denominated the craft of my invention an Aero-Glide Boat.

An object of my invention is to provide a high speed aquatic vehicle that utilizes aerodynamic phenomena in providing principal support for the vehicle at cruising speeds.

Another important object of the invention is to provide an aquatic vehicle that utilizes the "ground effect" of an airfoil of the vehicle, as a deliberate design limitation to prevent the vehicle from becoming entirely airborne.

It is also an object of the invention to provide an aquatic vehicle that is supported at cruising speeds by a combination of water planing skis and a wing. In this connection, I have provided a tri-ski arrangement which produces longitudinal and lateral stability for the aquatic vehicle. Furthermore, the vehicle inherently has directional stability due to a combination of aerodynamic and hydrodynamic factors, and aerodynamic control means are also provided for cooperation with the tri-ski arrangement in enhancing longitudinal balance.

Yet another important object of the invention is to provide an aquatic vehicle having an airfoil whose lift can be varied to produce optimum performance for particular conditions or for the particular phase of operation of the vehicle. The airfoil may conveniently be of the variable camber type and so may utilize trailing edge flaps which can be lowered, prior to acceleration, to most rapidly lift the vehicle to cruising condition, after which the airfoil can be adjusted for optimum cruise.

Another object of the invention is to provide a motor support arrangement which enables the invention to be incorporated into a craft that can be propelled by an outboard motor. In this connection, I have provided a novel motor support system which insures that the propeller remains properly oriented on the desired thrust axis irrespective of the variations in elevation of the hull of the craft above the surface of the water.

Another object of the invention is to provide an aquatic vehicle which is capable of far greater speeds than any hydroplane or hydrofoil water craft of the same weight to horsepower ratio and conversely to provide an aquatic vehicle which is capable of a far greater weight per horsepower loading than a comparable hydroplane or hydrofoil craft.

In general, it is also an object of the invention to provide an aquatic vehicle for high speed operation with a great degree of stability and comfort and without the incorporation of unduly complicated structures or mechanical devices.

These broadly stated objects and advantages, and others, will appear from the following description when taken in conjunction with the annexed drawings wherein;

FIGURE 1 is a top plan view of the presently preferred embodiment of the invention;
FIGURE 2 is a front elevational view;
FIGURE 3 is a side view;
FIGURE 4 is a partial rear elevational view, on a larger scale;
FIGURE 5 is a partial sectional view taken along the line 5—5 of FIGURE 1, and showing a portion of the aero dynamic controls for the aquatic vehicle;
FIGURE 6 is a partial vertical sectional view, along the keel line of the vehicle at the bow, showing controls for the nose ski and for the aerodynamic control surfaces;
FIGURE 7 is a partial vertical sectional view taken on the line 7—7 of FIGURE 1 to show the relationship of the parts of the outboard motor supporting linkage when the boat is entirely buoyantly supported;
FIGURE 8 is a view similar to FIGURE 7, but showing the parts of the motor mounting means in the positions assumed at cruising speeds, and further illustrating the manner in which the thrust axis of the propeller is maintained in the proper relationship to the craft; and
FIGURE 9 is a partial vertical sectional view through the transom of the craft taken along the line 9—9 of FIGURE 1 to illustrate a means for latching the motor mounting means in the raised position of FIGURE 7.

Broadly, the craft of the present invention comprises a hull 10, of relatively low length to beam ratio, on top of which a low aspect ratio wing 11 is mounted. Along its longitudinal center line, the craft has a cockpit 12 preferably faired into the upper surface of the wing 11 and extending into the hull 10. Hydrodynamic support, during cruising, for the craft is provided by a tri-ski arrangement including a nose ski 13 and a pair of aft skis 14 and 15. The nose ski 13 is pivotally mounted on the hull 10 at the apex of the leading edge of the wing 11, and is selectively manually controllable from the cockpit 12, in order to vary the attitude of the wing. The aft skis 14 and 15, however, are mounted on the under surfaces of a pair of sponsons or pontoons 16 and 17, that have horizontal pivot axis connections near the lower edge of the transom of the hull 10. An outboard motor 18 is mounted on the transom between the pontoons 16 and 17, on a parallel linkage arrangement which in turn is linkedly interconnected to the pontoons. Thus, as the hull 10 ascends above the water level, the pontoons 16 and 17 tilt rearwardly to place the skis 14 and 15 in planing position. The pontoons 16 and 17, in effect, buoyantly support the motor 18 and, due to the parallel linkage arrangement mounting the motor, a propeller 19 has its thrust axis properly aligned and maintained submerged beneath the surface of the water, during cruise.

For varying the coefficient of lift of the wing 11, a pair of trailing edge flaps 20 and 21 are provided, these flaps being positioned on opposite sides of the pair of pontoons 16 and 17. The flaps 20 and 21 may be lowered to their maximum in order to achieve the most rapid acceleration to cruising speed, after which the position of the flaps may be adjusted upwardly to achieve optimum efficiency of the wing 11 for the desired cruise condition. The flaps 20 and 21 are provided with trailing edge elevators 22 and 23 respectively, for trimming out any longitudinal imbalance due to unbalanced moments imposed by hydrodynamic forces on the skis and the aerodynamic forces of the wing 11.

The opposite tips of the wing 11 are provided with end plates 24 and 25. Although, for efficiency, these end plates are made as light as possible consistent with the structural integrity of the craft, and, although they may extend down to the water level even during cruising condition, the end plates 24 and 25 are not intended to serve as pontoons. The end plates 24 and 25 are adapted to greatly improve the aerodynamic efficiency of the low aspect ratio wing 11. The end plates 24 and 25 also insure against the craft becoming completely airborne. The skis 13, 14 and 15 are prevented from completely leaving the water, because of the end plates 24 and 25, so that the craft can safely and simply be kept under control because it does not need the complexity of a complete aerodynamic control system. This will be apparent from the following detailed description of my invention.

More specifically, the hull 10 has a keel 27 and chines 28 between which planing surfaces 29 are developed. The entire hull is preferably a stressed skin metal structure internally inforced by suitable bulkheads and stringers, but may also be made of wood, fiberglass or other more familiar and conventional boat hull materials. Although the hull 10, as viewed in FIGURE 1, has a relatively low length to beam ratio, it is to be understood that far greater ratios can be used. In view of the small ratio illustrated, the hull 10 is not provided with a step, but it will also be understood that for craft larger than that illustrated, a typical flying boat hull construction, utilizing a main step and after steps, can be employed.

For mounting the nose ski 13, a bracket 30 is secured to the nose of the hull 10 at the intersection of the chines 28 and immediately beneath the apex of the leading edge of the wing 11. This bracket has a pair of forwardly protruding spaced arms 31 between which a shaft 32 is secured, exteriorly of the nose of the hull 10. It will be observed, from FIGURE 6, that the bracket 30 is formed with an opening 33 immediately behind the shaft 32. One end of a lever 34 is journaled on the shaft 32 to extend inwardly into the hull 10 through the opening 33 of the bracket. The upper end of a curved member 35 is rigidly affixed to the journaled end of the lever 34 and at its lower end has the nose ski 13 secured, as an extension of the member 35.

As can best be seen in FIGURE 3, the nose ski 13 has a longitudinal profile complementary to the profile of the confronted portion of the keel 27. Thus, when the nose ski 13 is in the raised position, as when the craft is entirely buoyantly supported, the nose ski 13 nests against the keel 27. Although the member 35 and nose ski 13 may be made of a rigid material, some degree of flexibility is desirable so that when the nose ski 13 is in the planing position (shown in dotted outline in FIGURE 3) the buffeting of the waves can be absorbed without transmitting any undue shock to the hull 10, or to the control arrangement for the nose ski.

Obviously, the nose ski 13 will normally tend to assume the raised or retracted position in response to travel of the craft, but can be held in an adjusted lowered position by control means available to the operator in the cockpit 12. Thus, referring to FIGURE 6, it will be seen that a control cable 37 is connected at one end to the rear or inner end of the lever 34, rearwardly of a bulkhead 38 through which the lever passes. The cable 37 initially extends downwardly from the end of the lever 34 to pass around the underside of a pulley 26, thence rearwardly and upwardly through suitable openings in the pair of bulkheads 39 and 40 and into the cockpit 12. It will be appreciated that the pulley 26 is stationarily mounted by a suitable bracket means (not shown).

Within the cockpit 12, a horizontal support member 41 mounts a nose ski quadrant 42. A nose ski control lever 43 has its lower end pivotally mounted in the center of the quadrant 42 and the rear end of the control cable 37 is connected to the lever, intermediate its ends, as indicated at 44. Accordingly, when the operator pulls rearwardly on the lever 43, the nose ski 13 is moved towards the dotted line position shown and this brings about a corresponding change in the angle of attack of the wing 11. When the nose ski 13 is set for a desired angle of attack, the control lever 43 can be locked in adjusted position on the quadrant 42 by means of a conventional type of quadrant lock 45.

The configuration of the pontoons 16 and 17 is shown in plan view in FIGURE 1. Those portions of the aft skis 14 and 15 concealed beneath the pontoons 16 and 17 in FIGURE 1 have substantially the same plan outline as the pontoons. The aft skis protrude rearwardly beyond the pontoons, having substantially rectangular trailing projections, although these projections may taper to a point. As has been mentioned, the pontoons 16 and 17 are hingedly connected to the hull 10 and when the craft is at rest they buoyantly support the skis 14 and 15 in substantially horizontally extending position, as shown in solid outline in FIGURE 3. During cruising, after the hull 10 has been lifted clear of the body of water, the skis 14 and 15 are inclined into planing position, as is shown by the phantom outline in FIGURE 3, being normally biased to such planing positions by the weight of the motor 18 transmitted onto the pontoons 16 and 17.

As is shown in FIGURES 7 and 8, the hull 10 has a transom 47 behind which the pontoons are supported on horizontal pivot axes slightly spaced above the bottom of the hull and the bottom of the pontoon. Thus, the transom in front of each pontoon has a pair of aligned brackets 48 which support a shaft 49. Each pontoon has a pair of horizontally spaced apart and aligned brackets 50, journaled on the shaft 49, whereby the pontoon is pivotally movable between the positions indicated in FIGURES 7 and 8.

It will be appreciated that when the tail skis are in the inclined planing positions shown in FIGURE 8, they will be subjected to an appreciable amount of buffeting depending on the speed of the craft and wave conditions. In order to prevent any high frequency pitching movements of the pontoons and skis because of such buffeting, each pontoon at its upper end is interconnected to a means for yieldably resisting momentary shocks. Thus, vertically extending support member 51 is provided in the hull 10, forwardly of each of the pontoons 16 and 17 and beneath the upper surface of the wing 11. The forward end of a fluid cylinder 52 is pivotally connected, as at 53, to the rear face of this support member. A reciprocable piston 54 is contained in the cylinder 52, being drivably connected to a coaxial piston rod 55 that extends rearwardly out of the cylinder and through an aligned opening 56 in the transom 47. The rear end of each piston rod 55 is pivotally connected, as at 57, to the forward face of one of the pontoons 16 and 17. The cylinder 52 is substantially fluid tight and may contain a liquid or a gas that passes between opposite sides of the piston 54 through an axially extending orifice 58 formed through the piston. This arrangement will prevent undesired pitching movements of the pontoons in response to transient impacts on the skis, but it will, of course, be understood that a wide variety of other shock absorbing means may be utilized for the purpose.

An arrangement which I have devised for keeping the thrust axis of the motor propeller 19 horizontally directed and submerged in the body of water is also shown in FIGURES 7 and 8. This means includes a vertically disposed motor mounting board 60 having each of its ends interconnected to the transom 47 by a parallel linkage. Thus, adjacent both ends of the mounting board 60, the transom 47 mounts vertically spaced apart and aligned pairs of pivot brackets 61 while the confronting end of the mounting board mounts a pair of vertically spaced apart and aligned pivot brackets 62. A link 63 pivotally interconnects each pivot bracket 62 to its corresponding pivot bracket 61 and a parallelogram linkage is thus provided of which two sides comprise the pair of links 63 and whose other sides comprise the transom 47 and the plane of the mounting board 60.

It should be understood that the outboard motor 18 is attached to the mounting board 60 in a conventional manner. Usually this is accomplished by a clamping means, many types which are commercially available in kit form, which can be utilized to mount motor 18 on the mounting board 60 so that the motor is steerable about a vertical axis. Many types of steering cable assemblies are also commercially available whereby the motor 18 can be pivoted on its vertical steering axis from the cockpit through a steering wheel (not shown).

The opposite ends of the mounting board 60 are also linkedly connected to the pontoons 16 and 17 so that the propeller 19 will remain in the water when the hull is out of the water, as in FIGURE 8. A pair of pivot brackets 65 are mounted on the opposite ends of the upper edge of the mounting board 60. The lower end of a center link 66 is pivotally carried by each bracket 65 and each of these center links at its upper end is pivotally interconnected to a pair of side links 67 and 68, on a common axis 69. The side link 67 extends forwardly from the common axis 69 and its forward end is pivotally supported on a bracket 70 affixed to the upper edge of the transom 47. The link 68 extends rearwardly from the common axis 69 and at its rear end is pivotally interconnected, as at 71, to the inboard side of one of the pontoons 16 or 17, as the case may be.

Referring now to FIGURE 4, it will be observed that each center link 66 is arranged in substantially a common vertical plane with the pivot brackets 61 carried on the transom 47. It will be appreciated that the path or locus of the lower end of each of the center links 66 is determined by the movement of the upper edge of the mounting board 60. Accordingly, when the mounting board moves from the raised position shown in FIGURE 7 to the extreme lower position shown in FIGURE 8, the pivot bracket 65 of the center link 66 engages the upper pivot bracket 61 of the transom 47. A stop is thus provided to limit extreme downward movement of the mounting board 60 and, also, of the pontoon 16 and 17. This stop may also be provided by abutment of the pivot brackets 62 with the rear face of the transom 47. At the same time, it will be observed from FIGURE 8 that the center link 66 has a length sufficient to prevent the common axis 69 of the three links 66, 67 and 68 from intersecting or passing or toggling through a line drawn between the axes 70 and 71. It will be apparent that this prevents any possibility that the pontoons, skis and motor could become locked in a down position.

During acceleration of the craft up to planing speed, it is desirable that the pontoons 16 and 17 and the motor mounting board 60 be maintained locked in the up position shown in FIGURE 7. Accordingly, a latching means is provided on the transom 47, engageable with the mounting board 60, and adapted for release from the cockpit 12 upon movement of the nose ski control lever 43 to move the nose ski 13 downwardly. As is best seen in FIGURE 9, the transom 47 on its rear face has a bracket 74, to pivotally support a latch 75. This latch hangs over the upper edge of the mounting board 60 and on its lower edge is provided with a forwardly facing shoulder 76 against which the mounting board 60 is normally biased by the weight of the motor 18. A cable 77 has its rear end secured to the upper end of the latch 75 and extends forwardly through an opening 78 formed in the transom, thence to the cockpit 12 (see FIGURE 6). Within the cockpit, the cable 77 is trained around a pulley 79 to be reversed and then has its other end connected to the nose ski control lever 43. In FIGURE 6, the control lever 43 is illustrated in full forward position, corresponding to fully raised or retracted position of the nose ski 13. Thus, when the craft approaches a speed at which the planing surfaces 29 of hull 10 come into play to provide primary support for the craft, a pull on the control lever 43 simultaneously starts the nose ski 13 downwardly and releases the latch 75 from the motor mounting board 60. This also causes release of the pontoons 16 and 17 whereby the tail skis 14 and 15 are free to assume the planing function for the craft, along with the nose ski 13, when the hull 10 and the planing surfaces 29 thereof break away from the water. As is shown in FIGURE 9, the latch 77, rearwardly of the shoulder 76, is formed with a cam edge 80 engageable with the forward edge of the upper surface of the motor mounting board 60 when the board rises. As is apparent, this permits relatching of the mounting board, motor, and pontoons 16 and 17, in the fully raised position of FIGURE 7, after the craft once again becomes buoyantly supported.

Control of the flaps 20 and 21 and elevators 22 and 23 can be accomplished in much the same manner as aircraft control surfaces. In the illustrated embodiment of the invention the flaps are shown as controllable by push-pull rods and the elevators are shown as controllable by push-pull cables. However, it will be understood that the particular means utilized for control do not comprise a part of the present invention and the illustrated controls are merely to be taken as representative.

Referring now to FIGURE 5, it will be seen that the flaps and elevators, when in the raised position, complete the normal airfoil configuration of the wing 11. Each flap, in this case the flap 21, is hingedly connected along the leading edge of its under surface to the trailing edge of the under surface of the main structure of the wing 11, as by a hinge 82. Along the leading edge of its upper surface, the flap is provided with a bracket 83 to pivotally seat one end of a push-pull rod 84. The other or forward end of the rod 84 is pivotally connected to the upper end of a lever 85 whose lower end is drivingly connected to one end of a torsion rod 86. Referring to FIGURE 1, it will be seen that the torsion rod 86 extends laterally through the hull 10, having its opposite ends journaled in suitable brackets 87. Although not shown, the rods 84 preferably mount conventional, aircraft-type spring snubbers to absorb water wave shocks on the flaps.

As can be seen in FIGURE 6, the torsion rod 86 extends through the cockpit 12 and is drivably connected to the lower end of a control lever 88, which is used by the operator to impart angular movement to the torsion rod and thus accomplish up and down movement of the flaps 20 and 21. This flap control lever is mounted on a control quadrant 89 which, in turn, is supported on top of the horizontal support member 41, and a conventional or commercially available type of quadrant control lock 89 is provided to retain the control lever 88 in a desired position on the quadrant 89.

The elevators 22 and 23 are also adapted for co-movement by the operator in the cockpit 12. Each of these elevators (as for example the elevator 23 shown in FIGURE 5) is hingedly connected along the leading edge of its upper surface to a trailing edge portion of the upper surface of the flap 20 or 21, as the case may be, by a hinge 91. Along the leading edge of its lower surface, the flap 23 mounts a downwardly extending bracket 92, whose lower end bears a rotatable fitting 93. The rear end of a control cable 94 is connected to the rotatable fitting, and extends forwardly, slidably encased in a flexible metallic sheath 95. The rear end of this sheath abuts the rotatable fitting 93.

The main structure of the wing 11 along its trailing edge and immediately in front of the flap 20 or 21, as the case may be, has a downwardly projecting bracket 97. At the lower end of this bracket, a rotatable fitting 98 is mounted to clamp around a portion of the flexible sheath 95. The fitting 98 has an axis of rotation substantially in vertical alignment with the flap hinge 82, while the rotatable fitting 93 has an axis of rotation substantially in vertical alignment with the elevator hinge 91. These four axes at 98, 82, 91 and 93 approximate a parallelogram linkage.

Thus, in the absence of actuation of the elevator control cable 94, raising and lowering movement of the flap 21 causes the elevator 23 to maintain its substantially horizontal attitude. This is shown by the phantom outline representation of the relative positions of the flap 21 and elevator 23 in FIGURE 5.

In order to deflect the elevators 22 and 23, independently of movement of the flaps 20 and 21, an elevator control lever 100 is mounted in the cockpit 12 on a quadrant 101. The lower end of this control lever, at the center of the quadrant 101, drivingly engages a torsion rod 102 that extends laterally beyond opposite sides of the hull 10, and has its opposite ends rotatably journaled in brackets 103 (see FIGURE 1). The opposite ends of the torsion rod 102 have crank arms 104 and the radially outer ends of these crank arms are drivingly connected to one or the other of the elevator control cables 94. With this arrangement, as with many other possible arrangements, the elevators 22 and 23 can be moved in unison independently of movement of the flaps 20 and 21. The control lever 100 in the cockpit 12 is provided with a conventional quadrant lock 105 whereby the elevators can be maintained in an adjusted position.

The end plates 24 and 25 provide a very high aerodynamic efficiency for the low aspect ratio wing 11. In addition, these end plates serve a very important function in preventing the craft from becoming entirely airborne, because they automatically effect a sharp decrease in the lifting capacity of the wing in the event that the lower edges of the end plates are lifted above the surface of the body of water to such an extent that the skis 13, 14 and 15 would be lifted out of the water.

Referring now to FIGURE 3, it will be seen that the end plates have a horizontal length exceeding the length of the wing tips. While the rear ends of the end plates are substantially even with the trailing edge of the flaps 20 and 21, the forward or leading edge 106 of each end plate projects beyond the leading edge of the adjacent portion of the wing 11. Each end plate has an upper edge 107 whose profile is substantially similar to the camber of the upper surface of the wing 11, but geometrically larger so that the upper edge of the end plate is spaced an appreciable distance above the upper surface of the wing. Each end plate has a lower edge 108, that is relatively sharp, that extends rearwardly and downwardly to a lowermost portion 109 that is lower than the bottom of the hull 10 but higher than the fully lowered positions of the skis 13, 14 and 15.

Many advantages of the short span of the wing of this craft will be obvious. The low aspect ratio wing makes for compactness, light weight and, particularly, directional stability, since the yawing force of a wave, for example, on one wing tip will not be as great as in the case of a high aspect ratio wing. However, the utilization of the end plates 24 and 25 is also of great importance in the practical attainment of these advantages in a partially airborne aquatic vessel of this type.

The end plates 24 and 25 achieve the aerodynamic advantages of a high aspect ratio wing but without the high cost and great operating hazards that a high aspect ratio wing would have in a craft of this type. With a conventional wing planform, the lower the aspect ratio the higher the coefficient of drag. However, the effect of having end plates is to reduce the induced drag of the wing just as much as if the span of the wing had been increased by the span, measured vertically, of the two end plates. In this invention the end plates 24 and 25 are deliberately extended to water surface level to magnify their effectiveness in increasing the wing span effect. In so doing, the effective aspect ratio of the wing 11 is more than doubled over that of a wing with end plates, but operating away from the water surface level. The low aspect ratio wing 11 thus has the aerodynamic efficiency of a much longer span wing.

The end plates 24 and 25 also prevent the formation of wing tip vortices, i.e., the tendency of the air at higher pressure below a wing to spill upwardly over the wing tip to the lower pressure upper surface. Because of the prevention of wing tip vortices by the end plates 24 and 25, more efficient utilization may be made of the ground effect phenomenon, particularly the ground effect of the lower surface of the wing 11. The ground effect causes a reduction in the drag due to lift and, therefore, the aerodynamic efficiency of the low aspect ratio wing is further enhanced.

The mode of operation of an aquatic vessel constructed according to my invention can perhaps be best understood by considering a typical journey. In FIGURE 3, the vessel is shown in solid outline as it appears when at rest and entirely buoyantly supported at a load water line. It will be recalled that the nose ski 13 is then pressed in the raised position against the keel 27 and the aft or tail skis 14 and 15 are locked in the raised position, along with the pontoons 16 and 17, due to the latching means shown in FIGURE 9.

The flaps 20 and 21 are first lowered to their maximum possible deflection, as limited by water level contact, by actuation of the flap control lever 88. The flaps and elevators 22 and 23 thus assume the positions relative to each other, and relative to the wing 11, illustrated in FIGURE 5. Lowering of the flaps greatly increases the lifting capacity of the wing 11 and also magnifies the ground effect of the wing's lower surface. Because of the parallel link interconnection of the elevators to the flaps, the elevators 22 and 23 are deflected upwardly relative to the flaps and thus tend to lift the nose or bow of the craft, during acceleration.

With the flaps now lowered, the craft is accelerated from rest by movement of the throttle (not shown) for the outboard motor 18. At the start, the weight of the craft is entirely supported by buoyancy at about water line A, but as the thrust of the propeller 19 exceeds the combined air and water drag the craft is accelerated. As the speed of the craft approaches the planing speed of the planing surfaces 29, more and more of the weight of the craft will be supported by the aerodynamic lift produced by the wing 11. As the craft approaches planing speed it assumes the attitude illustrated by its position relative to a planing water line B. The operator then pulls on the nose ski control lever 43. This causes lowering of the nose ski 13, thus increasing the angle of attack of the wing 11 whereby a greater portion of the weight of the craft may more quickly become airborne. Actuation of the nose ski control lever 43 simultaneously releases the latch 75 so that the aft skis 14 and 15 may start their downward movement to planing positions. The increase in the angle of attack will cause the hull 10 of the craft to break clear of the surface of the water and the craft will now accelerate rapidly to crusing speed because of the marked reduction in water drag. At cruising speeds, the hull 10 is clear of the water, whose then level is represented by the line C.

The craft's weight is now supported by the dynamic reaction of the water on the nose ski 13 and aft skis 14 and 15, and by the airlift of the wing 11. In order to reduce the drag due to the lowered attitude of the flaps 20 and 21, the control lever 88 is now moved forwardly to partially raise the flaps in order to attain a minimum angle of attack for the wing 11 consistent with the desired cruising speed of the craft. When the hull 10 is completely clear of the surface of the water, the only contact of the craft with the water is through the hydrodynamically responsive medium of the nose ski 13, aft skis 14 and 15 and propeller 19. The lowermost portion 109 of the end plates 24 and 25 is depicted as being spaced above the surface of the water and this has the advantage of reducing water drag on the end plates. However, these end plates may, if desired, extend down and into the surface of the water even at cruising speeds, preferably having a knife edge such as is shown in FIGURE 2, to decrease water resistance.

It is to be understood that after each actuation all of the control levers 43, 88 and 100 are to be locked in place. With the craft at cruising speed, it may be found that there is, initially, a state of longitudinal imbalance of pressures of the nose ski 13 and the aerodynamic forces on the wing 11, or, an imbalance may exist in pressures on the aft skis 14 and 15 compared to the aerodynamic forces of the wing 11. Thus, if it is found that the craft is riding nose-heavy, so that extreme buffeting on the nose ski 13 is occurring, the elevator control handle 100 is moved rearwardly to increase the upward deflection of the elevators 22 and 23. On the other hand, if the craft is riding tail-heavy, the control lever 100 is moved forwardly to increase the downward deflection of the elevators 22 and 23. When the desired trim of the craft has been attained, the elevator control lever 100 is locked in place by means of the quadrant lock 105.

Preferably, the center of gravity of the craft is positioned forwardly of the center of lift of the wing 11. The fore and aft disposition of the three skis, in conjunction with the aerodynamic controls for the wing 11, gives a fine degree of longitudinal balance control. The tri-ski arrangement also provides lateral balance control. In this connection and referring to FIGURE 2, it will be observed that skis 14 and 15 include a dihedral angle, since they slope downwardly and inwardly from the opposite sides of the hull towards the keel 27.

The craft is steered in the usual manner by causing pivotal movement of the motor 18 on its vertical pivotal axis. Obviously, this will cause inclination of the wing 11 to the left or right, as the case may be, and thus bring the end plates 24 and 25 into more or less contact with the water.

However, in a banked attitude the craft will not tend to cartwheel because of the added water drag on one of the end plates. This is primarily because of the very low aspect ratio of the wing, which provides a very short couple as between the keel line and the one of the end plates which happens to be knifing through the water. Furthermore, it will be borne in mind that due to the great proportion of the weight of the entire craft, perhaps 90%, which is supported by the wing 11, the magnitude of forces due to water reaction on the lower end plate is not great enough to induce yawing in the craft. In this connection the elevators 22 and 23 may be rigged with controls for operation as elevons, rather than as pure elevators, whereby greater control over the roll axis of wing 11 may be exercised.

The craft cannot become completely airborne because this would entail lifting the propeller 19 out of the water. Obviously if this happens, from any cause, the continuing thrust necessary to produce sustained lift is lost and, upon the consequent loss of air speed, the craft will settle back into the water. In addition (and, perhaps, more importantly) the presence of the end plates 24 and 25 will prevent the craft from ever becoming completely airborne. In this connection, while the lowermost portions 109 of the end plates are preferably lower than the lowest point of the keel line of the craft, they should not exceed the depth of the skis 13, 14 and 15 in their extreme lowered position (or the depth of hydrofoils, if used instead of skis). As a result, if the skis ever leave the water, this increases the already present spacing between the lower edges 108 of the end plates and the surface of the water. Whenever there is any spacing between the lower edges 108 of the end plates and the surface of the water, a circulatory degradation effect occurs, whereby wing tip vortices tend to develop; i.e., the higher pressure air on the under surface of the wing 11 (which is normally "sealed in" by the proximity or contact of the lower edges 108 of the end plates with the water) can escape to flow upwardly along the outsides of the end plates to form wing tip vortices. This circulation reduces the ground effect. The induced drag of both the lower and upper surfaces of the wing 11 is radically and suddenly increased, increasing the stalling speed of the wing 11. The craft is thus inherently incapable of leaving the surface of the water, other than momentarily.

The degradation of the ground effect just mentioned is also of importance in effecting turns with the craft. Thus, in a turn, when the wing 11 is banked, the end plate on the outside of the turn is lifted above the surface of the water. Accordingly, even though the half of the wing on the outside of the turn is traveling at a higher air speed than the portion of the wing on the inside of the turn, the stalling tendency will occur, aerodynamic drag will be increased and this sets up a counterbalancing moment to counteract any cartwheeling tendency which may occur because of the depth to which the end plate on the inside of the turn is sunk in the water.

Since the craft of my invention depends not only on hydrodynamic forces, but also aerodynamic forces for its support at cruising speed, it will be apparent that wind direction and velocity will have an effect on the performance of the craft. In this connection, however, it is to be borne in mind that the aeroglide boat is primarily a high speed, high performance craft and thus should be usable under all normal wind conditions. For example, a 12 foot hull provided with a 120 square foot wing, with an aspect ratio of about 2, can carry two passengers at upwards of 70 knots, with a 40 horsepower outboard engine. Aside from the fact that this is a far greater efficiency in terms of power loading than is attainable with hydrofoil or hydroplane types of vessels, it will be apparent that with the high speed attainable by such a craft, it is operable even with tailwinds of 30 knots, assuming that wave conditions permit operation.

Although a preferred embodiment of my invention as presently contemplated has been disclosed and described herein, it is to be understood that I do not mean to be limited to the various details of construction hereinabove set forth, but only by the spirit and scope of the appended claims.

I claim:

1. In an aquatic vehicle: a buoyant hull; a nose ski pivotally mounted at the bow of said hull for planing the water at crusing speeds of said vehicle and for supporting said bow above the water, while planing; a pair of aft skis mounted on opposite sides at the stern of said hull, said aft skis being movable to positions beneath the bottom of said hull for planing the water at cruising speeds while supporting said stern above the water; a means on the stern of said hull to support an outboard motor horizontally closely adjacent said hull and for vertical movement relative to said hull to maintain a propeller of said motor submerged when said hull is out of the water; link means interconnecting said aft skis and said motor support means for vertical co-movement; and a wing mounted on said hull that is spaced above the water when said hull is at rest, said wing providing sufficient aerodynamic lift, at cruising speeds of said vehicle, to lift said hull out of the water, the center of lift of said wing being positioned rearwardly of the center of gravity of the vehicle.

2. In an aquatic vehicle: a buoyant hull; vertically adjustable hydrodynamically responsive means on and extending downwardly from said hull for supporting a portion of the weight of said vehicle at cruising speeds of said vehicle; a wing having an aspect ratio of approximately 2 mounted on said hull to aerodynamically lift said hull from the water at crusing speeds of said vehicle whereby said hull is lifted from the water and partially supported by said means; and aerodynamic means on said wing for increasing the induced drag of said wing when said wing lifts said hull out of the water above an elevation at which said hydrodynamically responsive means will lift out of the water, to prevent said vehicle from becoming entirely airborne, whereby said hydrodynamically responsive means remain in the water.

3. In an aquatic vehicle: buoyant support means; a hydrodynamically responsive means on and extending downwardly from said vehicle for partially supporting said vehicle at cruising speeds of said vehicle; a wing mounted on said vehicle to aerodynamically lift said vehicle from the water at cruising speeds of said vehicle; selectively controllable trailing edge flaps on said wing for varying the co-efficient of lift of said wing; selectively controllable elevator control surfaces mounted on the trailing edges of said flaps for exercising control about the pitch axis of said wing; and aerodynamic means on said wing for increasing the induced drag of said wing when said wing lifts said vehicle out of the water above an elevation at which said hydrodynamically responsive means will lift out of the water, to prevent said vehicle from becoming entirely airborne, whereby said hydrodynamically responsive means remains in the water.

4. An aquatic vehicle as set forth in claim 3 in which each flap is hingedly connected to the wing and each elevator control surface is hingedly connected to a flap, such hinged connections comprising portions of a parallelogram linkage means for maintaining said elevator control surface in substantially horizontal attitude when said flap is deflected down.

5. In an aquatic vehicle: a buoyant hull; hydrodynamically responsive means on said hull hull to partially support said hull above the water at cruising speeds of said vehicle; a low aspect ratio wing mounted on said hull to aerodynamically lift said hull from the water at cruising speeds of said vehicle; and a pair of end plates mounted on opposite tips of said wing in chordwise relationship, said plates extending vertically from said wing tips to contact the surface of the water when said hull buoyantly supports said vehicle; said plates having a chord length at least as great as the chord of said wing tips and being adapted and arranged to prevent aerodynamic circulation effects at said wing tips during cruising speeds of said vehicle only so long as said hydrodynamically responsive means remain in the water.

6. An aquatic vehicle as set forth in claim 5 in which the lower edges of said end plates have lowermost portions that extend beneath the level of the keel of said hull, said portions being above the level occupied by said hydrodynamically responsive means, said portions being spaced above the surface of the water when said hydrodynamically responsive means are at the surface of the water to increase the induced drag of said wing due to aerodynamic circulation effects at said wing tips reducing the ground effect of the under surface of said wing.

7. An aquatic vehicle as set forth in claim 6 in which said end plates have a leading and upper edge extending forwardly and upwardly from the leading edge and upper surface, respectively, of said wing tips, said leading and upper edges of said end plates having a profile substantially similar to the camber of the upper surface of said wing.

8. In an aquatic vehicle: a buoyant hull; hydrodynamically responsive means on said hull for partially supporting said hull on and above the water at cruising speeds of said vehicle, said means including a member mounted on the nose of said hull that is selectively adjustable upwardly and downwardly, towards and away from said hull; a wing mounted on said hull to aerodynamically lift said hull from the water at cruising speeds of said vehicle, the center of lift of said wing being positioned aft of the water of gravity of said vehicle, the angle of attack of said wing being variable by adjusting said member upwardly and downwardly; selectively controllable trailing edge aerodynamic flaps for said wing for varying the co-efficient of lift of said wing; selectively controllable elevator control surfaces mounted on the trailing edges of said flaps for exercising aerodynamic control about the pitch axis of said wing; and aerodynamic means on said wing for increasing the induced drag of said wing when wing lifts said hull out of the water above an elevation at which said hydrodynamically responsive means will be lifted out of the water, to prevent said vehicle from becoming entirely airborne, whereby said hydrodynamically responsive means remains in the water.

9. An aquatic vehicle comprising: a buoyant hull; a wing mounted on top of said hull, said wing having its longitudinal center line in a common vertical plane with a keel of said hull, to aerodynamically lift said hull from the water at cruising speeds of said vehicle; a pair of selectively controllable flaps for varying the camber of said wing, mounted at the trailing edge of a main structure of said wing to comprise trailing edge portions of said wing and disposed on opposite sides of and extending rearwardly from a transom of said hull and extending outwardly to the tips of said wing; a pair of selectively controllable elevators, each comprising a trailing edge portion of one of said flaps, for exercising aerodynamic control about the pitch axis of said wing; a pair of end plates mounted on opposite tips of said wing in chordwise relationship, said plates extending vertically from said wing tips to contact the surface of the water when said hull buoyantly supports said vehicle, said plates having a chord length at least as great as the chord of said wing tips, said end plates having a leading and upper edge disposed forwardly and upwardly from the leading edge and upper surface, respectively, of said wing tip, said leading and upper edge of said end plates having a profile similar to the camber of the upper surface of said wing; a nose ski pivotally mounted at a forward end thereof on the bow of said hull to trail rearwardly beneath the keel of said hull and selectively movable upwardly and downwardly with respect to said hull, said nose ski in lowered position serving to hydrodynamically support the bow of said hull at cruising speeds of said vehicle and also serving as a means to vary the angle of attack of said wing when said nose ski is raised and lowered; a pair of laterally spaced apart pontoons mounted between said flaps on the aft face of said transom, said pontoons being hingedly connected to said transom for vertical movement relative to said hull; a pair of aft skis each of which is secured to the bottom of one of said pontoons for trailing behind said transom on opposite sides of the keel of said hull, to be lowered into hydroplaning position by lowering movement of said pontoons to hydrodynamically support the stern of said hull at cruising speeds of said vehicle; a motor mounting board linkedly connected to the aft face of said transom between said pontoons, for vertical movement relative to said hull whereby a motor mounted on said board can be lowered to maintain a propeller thereof submerged when said hull is lifted out of the water; and means linkedly interconnecting said board to both of said pontoons to effect vertical co-movement of said board and said pontoons whereby said aft skis are biased into lowered positions by the weight of a motor on said board when said vehicle is at cruising speeds and whereby said motor, said board and said aft skis are buoyantly supported in raised position by said pontoons when said vehicle is buoyantly supported by said hull.

10. An aquatic vehicle as set forth in claim 9 in which each of said flaps is hingedly connected to said wing and each of said elevators is hingedly connected to a flap, such hinged connections comprising portions of a parallelogram linkage means for maintaining said elevators in substantially horizontal attitude when said flap is moved up or down, said elevators being interconnected to a remotely controllable means for changing the attitude of said elevators independently of movement of said flaps.

11. An aquatic vehicle as set forth in claim 9 in which said hull, in the stern, mounts a pair of shock absorbing means, each of which is connected to one of said pontoons to yieldably resist vertical movement of said pontoons, said skis and said motor in response to transient water wave shocks on said skis at cruising speeds of said vehicle.

12. An aquatic vehicle as set forth in claim 9 in which said transom mounts a latching means engaged with said mounting board to releasably hold said board, said pontoons and said skis in raised positions.

13. An aquatic vehicle as set forth in claim 12 in which said nose ski is vertically movable through a means including a control lever mounted on a quadrant in a cockpit of said vehicle, and said latching means is releasable in response to initial movement of said control lever in a direction to lower said nose ski through a means interconnecting said control lever and said latching means.

14. In a vessel, buoyant support means for said vessel, vertically adjustable hydrodynamic means on said vessel positioned and arranged to provide hydrodynamic longitudinal and lateral support for said vessel when said buoyant support means is out of the water, a low aspect ratio wing on said vessel to aerodynamically lift and support said buoyant support means out of the water when said vessel is propelled, and a pair of end plates on opposite ends of said wing in substantially chordwise relationship to said wing and extending downwardly from said wing to terminate in lowermost edges vertically spaced above a substantially horizontal plane defined with said hydrodynamic means only when said hydrodynamic means is at its lowest vertical level, so that said hydrodynamic means are in the water when said lowermost edges of said end plates have been lifted from the water, said end plates being adapted to increase induced drag of said wing when said lowermost edges of said end plates lift away from the surface of the water whereby to prevent lifting of said hydrodynamic means from the water.

15. A vessel as in claim 14 in which said wing has selectively controllable trailing edge flaps which can be lowered to positions in which lowermost edge portions of said flaps clear the surface of the water when said vessel is at rest on said buoyant support means.

16. A vessel as in claim 14 in which said hydrodynamic means includes forward hydrodynamic means located along the longitudinal axis of said vessel and also includes port and starboard hydrodynamic means at the stern of said vessel and substantially equally laterally offset from said longitudinal axis.

17. A vessel as in claim 14 in which said vessel has a center of gravity situated forwardly of the center of lift of said wing.

18. In a vessel, a buoyant hull, hydrodynamic means on said hull to longitudinally and laterally support said hull above the water when said vessel is propelled, said means including port and starboard hydrodynamic means at the stern of said vessel and mounted for vertical movement relative to said hull, support means on the stern of said hull between said port and starboard means to support a water screw horizontally closely adjacent said hull and for vertical movement relative to said hull between raised and lowered positions, and means interconnecting said support means and said port and starboard means to translate vertical movement of said port and starboard means into co-directional movement of said support means, said support means having a greater range of vertical movement than said port and starboard means.

19. A vessel as in claim 18 in which shock absorbing means is connected intermediate said port and starboard means and said stern to yieldably resist vertical movement of said port and starboard means.

20. A vessel as in claim 18 in which said port and starboard means is pivotally mounted to effect said vertical movement and said support means is a part of a parallelogram linkage including said stern as fixed side of said linkage, and in which said means intermediate said support means and said port and starboard means comprises a pair of pivotally connected links one of which has an end pivotally connected to said stern and the other of which has an end pivotally connected to one of said port and starboard hydrodynamic means, said support means pivotally supporting one end of a center link whose other end is pivotally connected to the common pivotal connection of said pair of links, said center link having a length to prevent toggling of said pair of links when said support means is in fully lowered position whereby said support means can yield to an upwardly directed force for returning to a raised position.

References Cited in the file of this patent

UNITED STATES PATENTS

| | | |
|---|---|---|
| D. 117,415 | Gassaway | Oct. 31, 1939 |
| D. 191,928 | Skliar | Dec. 12, 1961 |
| 1,296,089 | Kahl | Mar. 4, 1919 |
| 1,728,937 | Kemp | Sept. 24, 1929 |
| 1,750,959 | Lake | Mar. 18, 1930 |
| 1,988,148 | Weymouth | Jan. 15, 1935 |
| 2,559,036 | Warner | July 3, 1951 |
| 2,576,744 | Anderson | Nov. 27, 1951 |
| 2,631,794 | Warner | Mar. 17, 1953 |
| 2,658,701 | Robertson | Nov. 10, 1953 |
| 2,804,038 | Barkla | Aug. 27, 1957 |
| 2,821,948 | Harkson | Feb. 4, 1958 |
| 2,886,462 | Jagiel | May 12, 1959 |
| 2,913,196 | Cox | Nov. 17, 1959 |
| 2,949,791 | Cattaneo et al. | Aug. 23, 1960 |
| 3,013,515 | Morel | Dec. 19, 1961 |
| 3,016,864 | Woodfield | Jan. 16, 1962 |

FOREIGN PATENTS

| | | |
|---|---|---|
| 469,300 | Italy | Feb. 22, 1952 |
| 484,373 | Italy | Sept. 8, 1953 |
| 497,049 | Germany | May 7, 1930 |
| 458,807 | France | Aug. 18, 1913 |
| 111,303 | Great Britain | 1921 |
| 518,878 | Great Britain | Mar. 11, 1940 |
| 700,771 | Great Britain | Dec. 9, 1953 |

UNITED STATES PATENT OFFICE
CERTIFICATE OF CORRECTION

January 21, 1964

Patent No. 3,118,411

Vsevolod B. Koriagin

It is hereby certified that error appears in the above numbered patent requiring correction and that the said Letters Patent should read as corrected below.

Column 11, line 25, strike out "hull", second occurrence; line 52, for "loading" read -- leading --; line 64, for "water" read -- center --.

Signed and sealed this 23rd day of June 1964.

(SEAL)
Attest:

ERNEST W. SWIDER
Attesting Officer

EDWARD J. BRENNER
Commissioner of Patents